United States Patent

[11] 3,607,627

| [72] | Inventors | Harold P. Furth<br>Princeton;<br>John L. Johnson, Princeton; George V.<br>Sheffield, Hopewell, all of N.J. |
|---|---|---|
| [21] | Appl. No. | 766,432 |
| [22] | Filed | Oct. 10, 1968 |
| [45] | Patented | Sept. 21, 1971 |
| [73] | Assignee | The United States of America as represented by the United States Atomic Energy Commission |

[54] STELLARATOR CONFIGURATION UTILIZING INTERNAL SEPARATRICES
9 Claims, 19 Drawing Figs.

| [52] | U.S. Cl. | 176/3 |
| [51] | Int. Cl. | G21b 1/00 |
| [50] | Field of Search | 176/3 |

[56] References Cited
UNITED STATES PATENTS

| 3,015,618 | 1/1962 | Stix | 176/3 |
| 3,219,534 | 11/1965 | Furth | 176/3 |
| 3,278,384 | 10/1966 | Lenard et al | 176/3 |
| 3,433,705 | 3/1969 | Cornish | 176/3 |

FOREIGN PATENTS

| 844,291 | 8/1966 | Great Britain | 176/3 |

Primary Examiner—Reuben Epstein
Attorney—Roland A. Anderson

ABSTRACT: Stellarator having internal separatrices such that the equilibrium properties are favorable for stability and stellarator method for providing a stable equilibrium region for confining a plasma both inside and outside the internal separatrices, and for maximizing the three functions of large rotational transform, strong shear $\theta$, and deep well $V''$.

NO SEPARATRIX

INVENTORS.
HAROLD P. FURTH
BY JOHN L. JOHNSON
GEORGE V. SHEFFIELD

INVENTOR.
HAROLD P. FURTH
BY JOHN L. JOHNSON
GEORGE V. SHEFFIELD

INVENTOR.
HAROLD P. FURTH
BY JOHN L. JOHNSON
GEORGE V. SHEFFIELD

STELLARATOR CONFIGURATION UTILIZING INTERNAL SEPARATRICES

This invention was made in the course of, or under a contract with the United States Atomic Energy Commission.

CROSS-REFERENCE TO RELATED APPLICATIONS
Fusion

Fusion Ser. No. 709,080 filed Feb. 28, 1968, now U.S. Pat. No. 3,433,705, dated Mar. 18, 1969 and assigned to the assignee of this application.

BACKGROUND OF THE INVENTION

1. Field of Invention

This invention relates to high-temperature plasma devices and more particularly to stellarators for magnetically confining a high-temperature plasma along an endless axis.

2. Description of the Prior Art

In the thermonuclear fusion research and development a need exists for magnetically confining a high-temperature plasma of ions and electrons away from the inside walls of a toroidal container. Various proposals have been made and used to this end, comprising the stellarators shown and described in U.S. Pat. No. 3,278,384 by the coinventor of this application, and the references cited in that patent, but it has been desirable for the equilibrium properties thereof to be improved for favorable stability by providing internal separatrices in place of the heretofore known separatrix outside the plasma region. A separatrix, as referred to herein, is a flux surface, in a set of nested magnetic surfaces, outside of which the magnetic surfaces have a different shape from those on the inside. Such flux surfaces are described by A. I. Morozov and L. S. Solov'ev, in "Reviews of Plasma Physics" (Consultants Bureau, N.Y. 1966) Vol. 2, p. 1. It is additionally advantageous to preserve the favorable features of multipolar stellarators, such as described in the above-cited references, and spherators, such as described in Princeton University Reports MATT-455, dated May 1966 and "The Proposed Princeton Quadrupole," dated Apr. 1967, while avoiding difficulties inherent in spherators by eliminating the floating coils inside the plasma region.

SUMMARY OF THE INVENTION

In accordance with this invention, a stellarator configuration with an internal separatrix is provided with the favorable features of multipolar devices or spherators, and without the difficulties of floating superconducting coils inside the plasma regions, by using specific positive currents in conductors having a pitch opposite from the usual stellarator cases. In one embodiment, the stellarator of this invention has specific axial solenoid and helical magnetic field windings all adapted to be energized in the same direction for producing an internal separatrix combined with strong shear and rotational transform will strong average gradient of magnetic field strength. With the proper selection of components, as described in more detail hereinafter, the desired internal separatrix and stable high-temperature plasma confinement are achieved.

The above and further novel features and objects of this invention will appear more fully from the following discussion and detailed description when the same is read in connection with the accompanying drawings. It is expressly understood, however, that the drawings are not intended as a definition of the invention but are for the purpose of illustration only. Indeed the specific conductor configurations we describe represent specific ways for generating the desired magnetic fields and with the proper selection of coil configurations by standard techniques the desired fields are provided with low power requirements.

BRIEF DESCRIPTION OF SEVERAL VIEWS OF THE DRAWINGS

In the drawings where like elements are referenced alike:

FIG. 10 is a partial three-dimensional view of the preferred three-wire embodiment for producing the sharp-cornered separatrix of FIG. 5a;

DETAILED DESCRIPTION OF THE PREFERRED EMBODIMENTS

An abstract of the principles involved in this invention is given in "Bull. Am. Phys. Soc." II, 13, 287 (1968) by coinventors of this application. The apparatus of this invention is incorporated into the existing stellarators so that use is made of the well-known techniques for forming axial, helical, and solenoidal electrical windings for producing the desired magnetic fields. These stellarators and techniques are described in the above-mentioned references as well as in "Controlled Thermonuclear Reactions" by Samuel Glasstone and Ralph H. Lovberg, published by D. Van Nostrand Company, Inc. in 1960, and "Project Sherwood—The U.S. Program in Controlled Fusion," by Amasa S. Bishop, published by Addison-Wesley Publishing Company, Inc. in 1958. Standard well-known techniques, such as ion cyclotron heating, magnetic pumping or injection of a beam of excited neutrals or molecular ions, are used to provide a hot plasma. Laser heating of suspended particles can alternately be used, however. For simplicity, stellarators like the Model C stellarator at Princeton University are used, since, as is well known, this Model C stellarator has an endless racetrack-shaped, magnetically permeable, evacuated confinement tube with a large ratio of major to minor axis so that the flux tubes therein are essentially linear, with the toroidal curvature being only a weak effect that does not affect the objects or purposes of this invention. Also, a divertor, such as is well known and described, for example, in the above-mentioned Lenard et al. patent and/or the references cited therein, which removes impurities from the plasma inside the endless evacuated confinement tube, may be eliminated.

Figure 2:
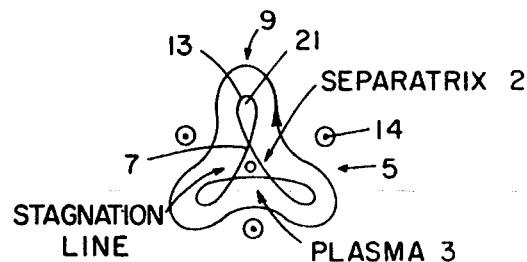
FIG. 2 is a partial cross section of the stellarator of this invention having helical windings energized in the same direction for forming nested magnetic surfaces having an internal separatrix.

The basic physical reasoning that led to this invention grew out of the finding that a separatrix associated with one or more stagnation lines, as shown in FIG. 2, can make the average field line curvature favorable giving rise to strong stability properties for confining a plasma 3 in an endless toroidal column 5. A stagnation line is described by the coinventor of this application in "Plasma Physics," International Atomic Energy Agency, Vienna, 1965, page 391. The basic feature of this invention that distinguishes it from the heretofore-known devices, however, is the discovery that the favorable region for plasma confinement can be outside an internal separatrix 2. For the purpose of this disclosure, a separatrix represents a magnetic surface 7 in a set 9 of nested magnetic flux surfaces (hereinafter referred to as magnetic surfaces 7) outside of which the magnetic surfaces 7 have a different shape from those on the inside of the separatrix.

Figure 3:
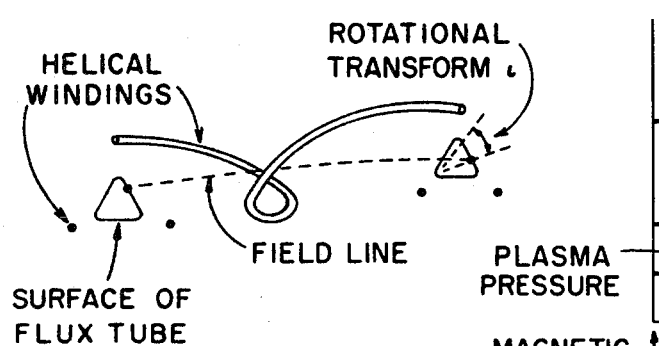
FIG. 3 is a partial schematic drawing of the helical stellarator winding of FIG. 1 and the surfaces of flux tubes therein illustrating the rotational transform $\iota$ thereof.

In understanding this invention, consider the well-known helical windings of Model C stellarator that provide a rotational transform and strong shear. We define the rotational transform $\iota$ as the average angle through which a magnetic field line passes around the minor circumference as shown in FIG. 3. Then the maximum possible value of $\iota$ is $2\pi$, which means that the pitch of the field line is the same as that of the helical windings. In the usual stellarator this value is attained only in the separatrix, with smaller values of $\iota$ on the inner magnetic surfaces. Furthermore, the usual stellarator cannot in practice be allowed to extend to the separatrix since the magnetic surfaces in stellarators with moderate aspect ratios become imperfect near there and plasma could escape to the wall along the magnetic field lines. Thus within the region actually occupied by the confined plasma the maximum rotational transform per helical winding wire period that can be achieved is generally only $\pi/2$ to $\pi$.

The magnetic shear $\theta$ is defined as the rate at which the rotational transform changes from magnitude surface 7 to magnetic surface 7 nested in a set 9; actually for a stellarator in which the magnetic surfaces 7 /approximated by concentric cylinders $\theta=(r^2/L) \, d\iota/dr$ with $r$ the surface radius and $L$ the length of a wire period over which the rotational transform is computed. In the usual stellarator the shear is large only near the separatrix, precisely in the region where the above-noted deterioration of the surfaces makes plasma confinement impractical.

A practical parameter to represent the average gradient of the magnetic field strength outward from the plasma is $V''(\psi)$ where V is the volume inside the magnetic surface 7 that encloses the flux $\psi$ and primes denote derivatives with respect to the argument. Stability studies, as reported in "Plasma Physics" 9, 611 (1967) by J. M. Greene and the coinventor of this application, shown that the second derivative $V''$ must be less than some easily calculated quantity for stability against interchanges on an ideal model and negative for stability against the gravitational mode. Also, as reported in "Physics of Fluids" 9, 1437 (1966) and the references cited therein, deep average magnetic wells, corresponding to large negative values of $V''$ provide strong stabilization for many instability modes.

These three properties, large rotational transform, strong shear $\theta$, and deep well $V''$, are highly desirable for plasma confinement because they help stabilize against a variety of instability modes. Until now, no way of modifying the stellarator to simultaneously maximize these three functions has been found. In accordance with this invention, however, a new type of stellarator has been discovered that simultaneously, provides large rotational transform $\iota$, strong shear $\theta$, and negative $V''$.

Figure 4:
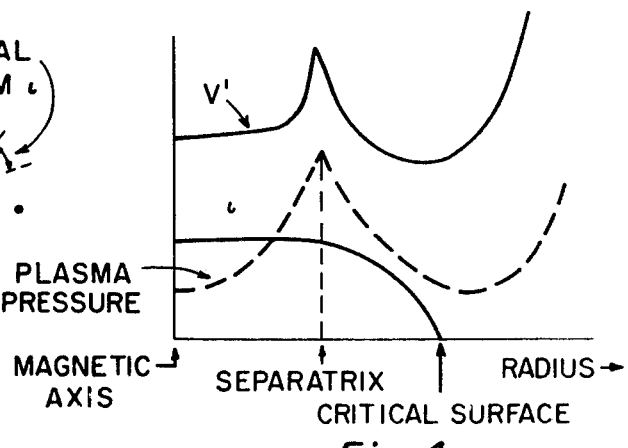
FIG. 4 is a graphic illustration of the system of this invention showing the plasma pressure, rotational transform $\iota$ and the derivative of the plasma volume V inside the magnetic surface that enclosed the flux $\psi$ with respect to $\psi$ as a function of radius from the magnetic axis of the stellarator configuration of FIG. 2 showing how the separatrix, and stagnation lines thereof are located to make V' a maximum on the internal separatrix and decreasing outside thereof.

As shown in FIG. 2, the new configuration of this invention has the basic features of an internal separatrix 2. The stagnation lines are located to make the first derivative a maximum on the internal separatrix 2, decreasing immediately outside as illustrated in FIG. 4. The plasma 3 fills the region inside the critical surface 7 bounding plasma column 5, which is defined as the surface beyond which $V'$ increases. The rotational transform on the separatrix 2 is always $2\pi$. The typical variation of the transform $\iota$ for the configuration of FIG. 2 is also shown in FIG. 4. Thus both the rotational transform $\iota$ and the shear $\theta$ are large in the strong negative-$V''$ region just outside the separatrix 2. The simultaneous achievement of these three aims is the important new feature of our invention.

Figure 1:
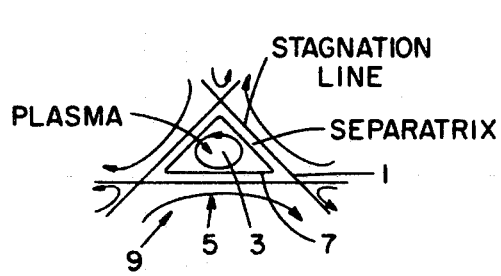
FIG. 1 is a partial cross section of a stellarator having oppositely energized helical windings.

A second favorable feature of this invention emerges when one considers practical stellarators with finite aspect ratio. Magnetic surfaces 7 usually break up in the vicinity of the separatrix 1 of FIG. 1 so that a density gradient of plasma 3 in a column 5 cannot be maintained there. In the usual stellarator this means that the plasma edge (i.e., the outside of column 5) must be kept well inside the separatrix 1, in a region of low shear and little or no well depth, because otherwise the plasma would flow randomly to the stellarator wall instead of diffusing into the conventional divertor thereof. In accordance with this invention, the internal separatrix 2 is internal to plasma 3 in column 5 and is enclosed by good magnitude surfaces 7 in a set of nested magnetic surfaces 7. To the extent the magnetic surfaces 7 are broken up by toroidal curvature, the plasma edge in column 5 will automatically move away from the separatrix 2. This invention thus has the advantage that one need not take special steps to exclude plasma 3 from this region along the separatrix 2, therefore, can make maximum use of the good stabilizing properties there.

Figure 5A:
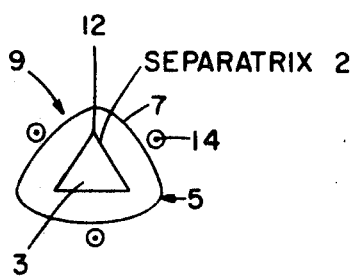
FIG. 5a is a partial schematic view of the stellarator configuration of FIG. 2 forming a separatrix with three sharp corners.
Figure 5B:
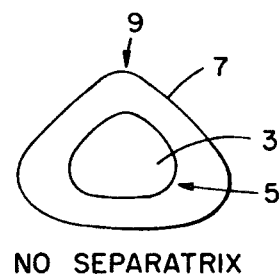
FIG. 5b is a partial cross section of a stellarator configuration forming nested magnetic surfaces without a separatrix.

We turn now to specific embodiments of the new type stellarator of this invention. The simplest solution is an internal separatrix 2 having sharp corners 12 without lobes at its edge, as shown in FIG. 5a. This configuration is the transitional case between the case of the internal separatrix 2 of FIG. 2 having lobes 13 and the no-separatrix case of FIG. 5b. We limit ourselves at this point for ease of explanation, therefore, to the sharp-edged case. To classify the possible solutions according to how many corners 12 the internal separatrix 2 has, the solutions being for any number $N$ or corners 12 as shown, for example, in FIGS. 5a 5c, and 5e.

The solutions for $N=3$ and higher are generated in the following way. If the magnetic field is given by $\underline{B}=\Delta\Phi$, then the behavior of $\Phi$ for small minor radius $r$ is $\Phi=z-k[2(N-1)/N^2]r^N \sin N(\theta+kz)+k[(N-2)/2N^2]r^{2N} \sin (\theta+kz)$. The equation for the magnetic surface 7 is: $r^2/2-[2(N-1)/N^2]r^N \cos N(\theta+kz)+[(N-2)/2N^2]r^{2N} \cos 2N(\theta+kz)=$ constant. In actual configurations made with the helical windings 14 of this invention, other terms in higher powers of $r$ will be introduced into $\Phi$, and will have some effect on the shape of the magnetic surfaces 7 and on the stability properties. The terms in $r^N$ and $r^{2N}$, as given above, however, provide the basic behavior of the configurations desired.

Figure 5C:
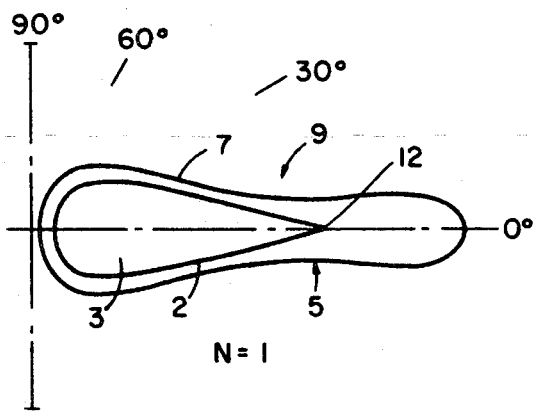
FIG. 5c is a partial cross section of a stellarator configuration forming an internal separatrix with one sharp corner.
Figure 5D:
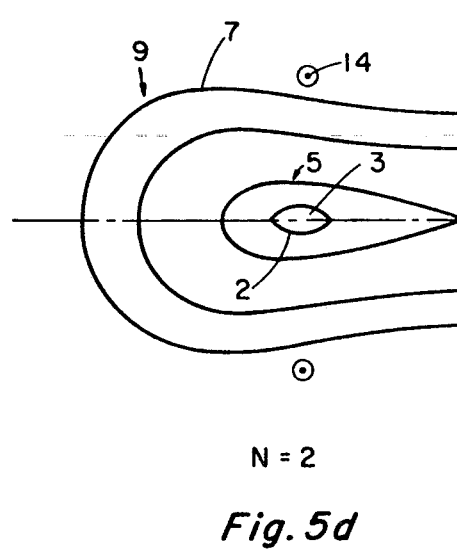
FIG. 5d is a partial cross section of a stellarator configuration having an internal separatrix with bad field line curvature, used to demonstrate what this invention isn't.
Figure 5E:
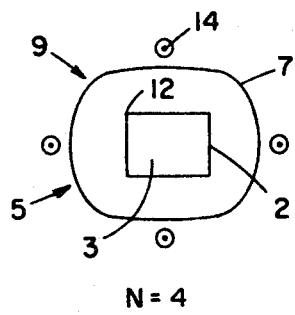
FIG. 5e a partial cross section of a stellarator having an internal separatrix with four sharp corners.

A simple way to realize such configurations is with specific helical stellarator windings 14 in combination with a conventional stellarator solenoid coil 15 with currents all in one direction to give the solution shown in FIGS. 5a, 5c or 5e wherein the dots in circles illustrate currents in windings 14 all directed normally out of the plane of the paper.

Figure 6:
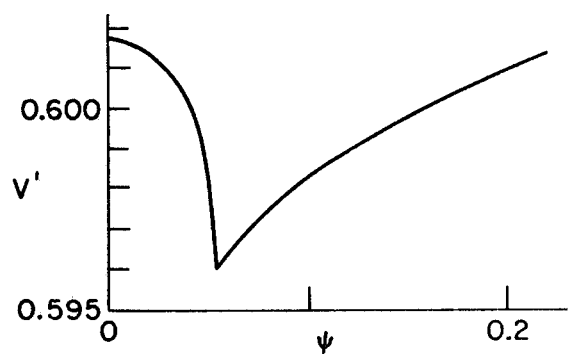
FIG. 6 is a graphic illustration of the magnetic surfaces of FIG. 5d wherein the first derivative of the volume inside the magnetic surface that encloses the flux $\psi$ with respect to $\psi$ is plotted against $\psi$ to show how the two helical wires thereof provide bad field line curvature.
Figure 7:
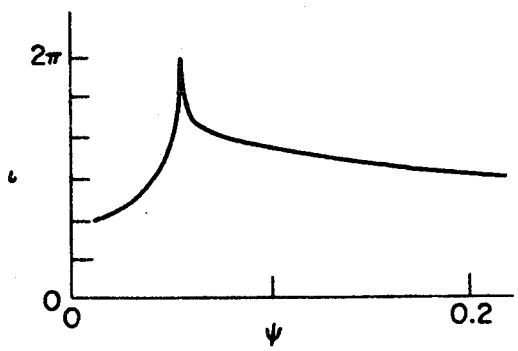
FIG. 7 is a graphic illustration of the rotational transform as a function of magnetic flux $\psi$ for the case of the two helical wires of FIG. 5d.

To illustrate how one can understand the mechanism of this invention, consider a configuration, FIG. 5d which does not satisfy the specifications of this invention. Consider two helical windings 14 twisting around a common axis parallel to the axis of a solenoid coil 15. If the currents in the helical windings 14 are in the same direction and strengthen the axial field produced by the solenoid 15 along the axis of the Model C stellarator confinement tube 17, which is magnetically permeable, evacuated, endless, toroidal, stellarator, plasma-confining tube with large ratio of major to minor axis, the magnetic surfaces 7 are ellipsoidal tubes twisting around the axis of the confinement tube 17, as in an ordinary $l=2$ stellarator. If, however, the currents in helical windings 14 weaken the axial field between them, the magnetic surfaces 7 are as illustrated in FIG. 5d. Also, FIGS. 6 and 7 illustrate $V'$ and $\iota$ respectively as functions of magnetic flux $\psi$ for the case where the helical windings 14 are 10 inches from the axis of confinement tube 17 with a 0.025 rad. per inch pitch and carry 20 amps in a 1-gauss axial field produced by the solenoid 15. Unfortunately, the region outside the separatrix 2 has unfavorable properties for stably confining a plasma 3 therein in a column 5.

The nature of the magnetic surface 7 produced by this configuration can further by understood by comparing them with "Plasma Physics and Controlled Thermonuclear Fusion Research" International Atomic Energy Agency, Vienna, 1966, Vol. 1, page 145 by B. McNamara, K. T. Whiteman, and J. B. Taylor, wherein general helically invariant systems are discussed. It is also noted that a stellarator having strong shear and negative $V''$ can be built using an $l=4$ configuration, as discussed in "Bull. Am. Phys. Soc." II, 13, 287 (1968) by L. Gourdon, D. Marty, and M. Vuillemin.

Figure 8:
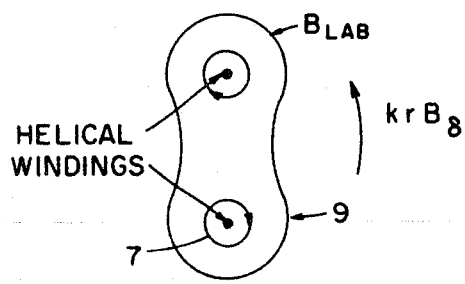
FIGS. 8 and 9 are partial schematic views of the magnetic surfaces of the configuration of FIG. 5d showing in FIG. 8 that the currents in the two helical windings thereof provide fields that decrease as the inverse of the distance from each wire, and in FIG. 9 the result of the superimposition on which is a $\theta$-field ($hr B_z$) due to an axial solenoid winding.
Figure 9:
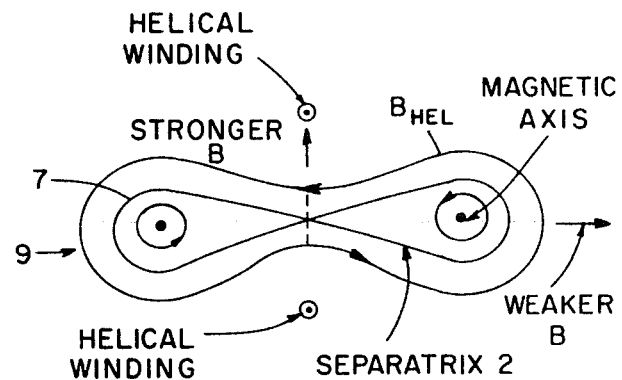

To see how this works, consider a transformation from laboratory coordinates to a frame twisting with the helical windings 14. Then $$\theta_{HEL} = \theta_{LAB} + hz \quad (1)$$
$$B_{\theta HEL} = B_z(rd\theta_{HEL}/dz) = B_{\theta LAB} + hrB_z \quad (2)$$
$$B_{rHEL} = B_{rLAB} \quad (3)$$

so that to a first approximation the currents in helical windings 14 provide fields that decrease as the inverse of the distance from each helical winding 14, superimposed on which is a $\theta$-field ($hrB_r$) due to the axial field produced by solenoid 15 in the laboratory frame, as illustrated in FIGS. 8 and 9. On the line perpendicular to the plane of the helical windings 14 and halfway between them, the two field components in Eq. (2) have opposite directions and subtract. Near the origin the $B_{\theta LAB}$ field dominates; far out the $B_z$ field does. Thus one can easily construct the configuration illustrated by FIG. 5d. Although $V'$ is favorable inside the regions bounded by the separatrix, it is unfavorable for confining plasma outside this separatrix. The configurations of this invention can be understood in a similar manner.

Figure 10:
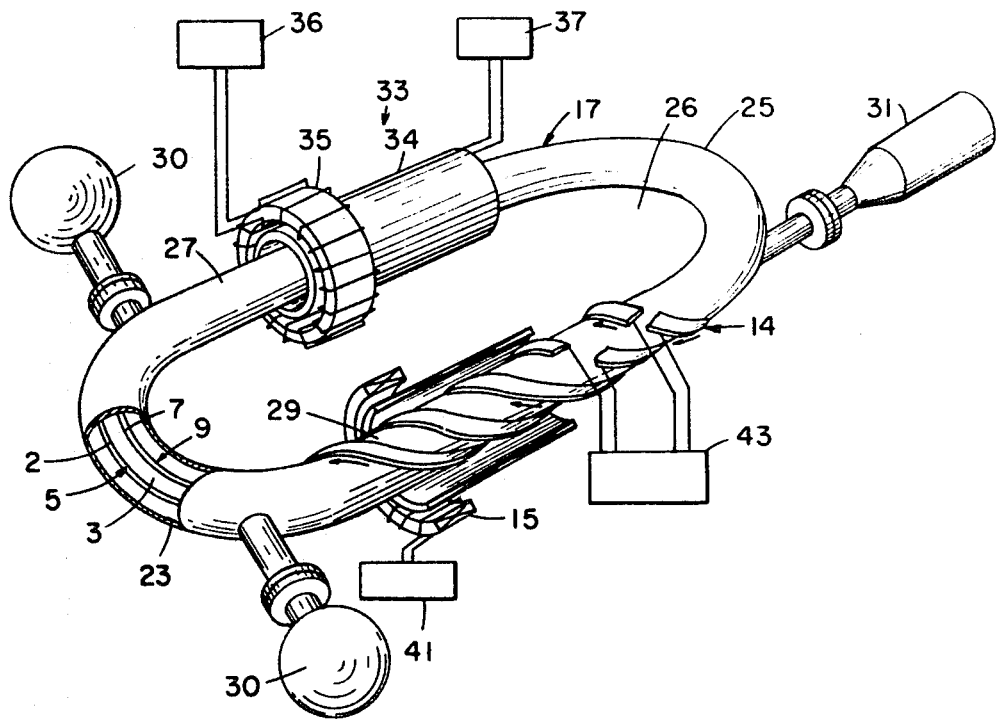

In a specific practical device of the preferred embodiment of this invention shown in FIG. 10, the axial solenoid coil 15 and helical windings 14 twist around a common axis in a conventional confinement tube 17. Using a low pitch for the field due to helical windings 14 in a straight system, for a set of $n$ turns at radius $a$ with each turn of the helical windings 14 twisting around the axis of confinement tube 17 in the direction of the axial solenoid field $B_o$ so hat it is located at $\theta = -(kz+\zeta_n)$ and carrying current $I_n$, the magnetic surfaces correspond to constant $$\psi = \frac{r^2}{2} - \sum_n \frac{I_n}{kB_0} ln\left[1 + \frac{r^2}{a^2} - 2\frac{r}{a}\cos(\theta + hz + \zeta_n)\right]. \quad (4)$$

The actual fields due to currents in such helical windings 14 distort the magnetic surfaces 7 slightly from that given by eq. 4 but cause no essential change.

If the currents in the three helical windings 14 of the embodiment of FIG. 10 are 120° apart at radius $a$ and equal and directed along $B$ and if their current $I_n/kB_o$ is greater than $2^{1/3}a^2/12$, the magnetic surfaces 7 look like those illustrated by FIG. 2. The lobes shown in FIG. 2, however, shrink into sharp corners at $r/a=2^{1/3}$ as $I_n$ decreases to this value. Since the magnetic surfaces 7 of FIG. 5b without an internal separatrix are obtained for even smaller $I_n$, the sharp corners 12 of the embodiment of FIG. 5a are advantageously employed. However, the lobes 13 of the separatrix 2 as in the illustration of FIG. 2, may be useful in forming natural strip divertors 21 whereby the interior region of the stellarator forming a plasma column 5 shown in FIG. 2 is stable and the regions in lobes 13 thereof take advantage of the special structure of the internal separatrix 2 to provide convenient inherent helical strip divertors 21 all around the endless confinement tube 17. The preferred stellarator having three helical windings 14 as illustrated by FIG. 10, therefore, eliminates spoiling the symmetry of the stellarator by carrying currents in the same direction in the axial solenoid coil 15 and all the helical windings 14. Also, the need for introducing special straight sections and conventional divertors into the stellarator is eliminated when lobes 13 are produced therein. Additionally, no current-carrying conductors need be placed in the end loops 23 and 25 of the confinement tube 17.

Figure 13:
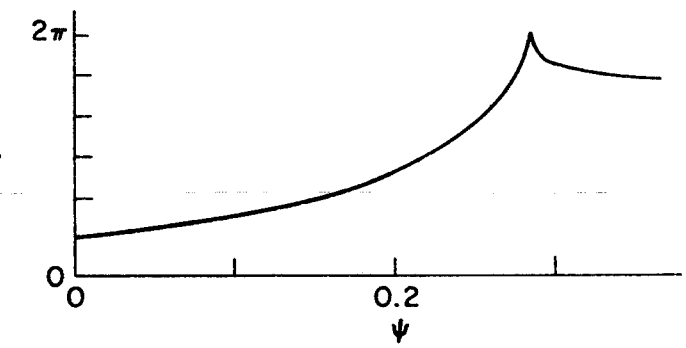
FIG. 12 and 13 are graphic illustrations of V' and $\iota$ vs $\psi$ for the embodiment of FIG. 11.
Figure 12:
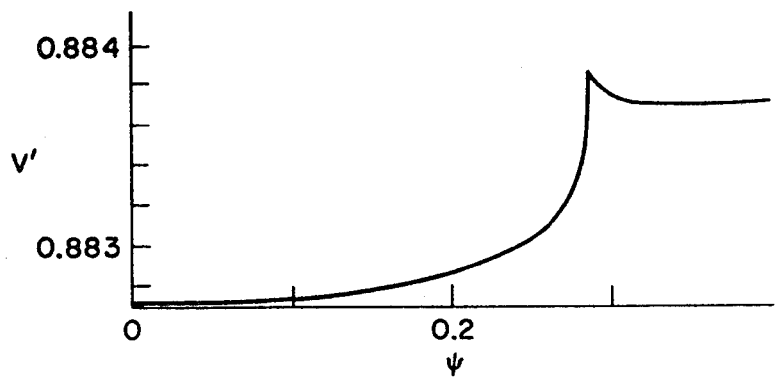
Figure 11:
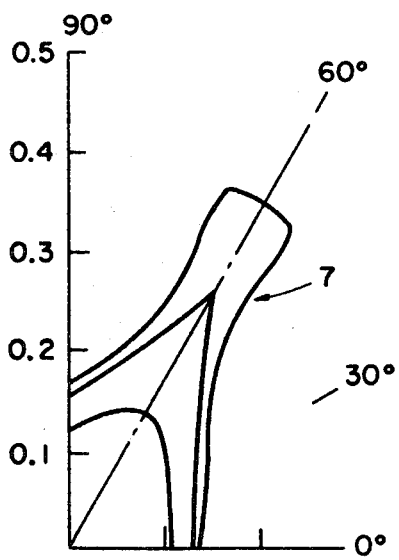
FIG. 11 is a partial schematic representation of a cross section of the configuration of FIG. 5a with V' vs ($\psi$and $\iota$ vs ($\psi$) given in FIGS. 12 vs 13.
Figure 15:
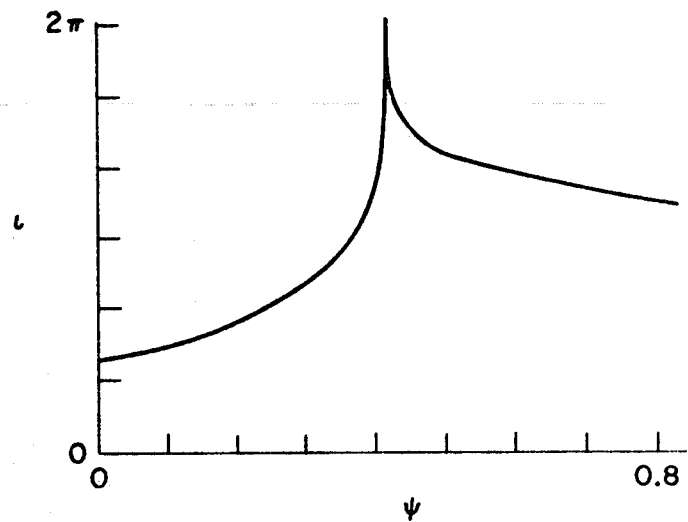
FIGS. 14 and 15 are graphic illustrations of V' and $\iota$ vs. $\psi$ for the one-cusp embodiment of FIG. 5c.
Figure 14:
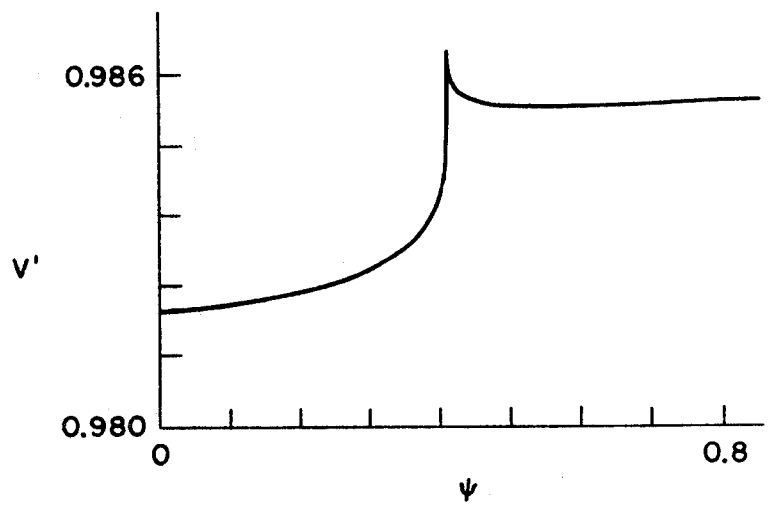

As will be understood from the above, the size and shape of the internal separatrix 2, can be changed from that discussed in the preceding paragraph by using additional helical windings 14 with the neighboring wires thereof carrying different amounts of current in the same direction. The example illustrated in FIG. 11, for example, is obtained with $V'(\psi)$ and $\iota(\psi)$ given in FIGS. 12 and 13, by setting the current $I_n/kB_o$ =1.386 for helical windings 14 at $\zeta_n=0, 2\pi/3$, and $4\pi/3$, and $I_n/kB_o=0.598$ for helical windings 14 at $\zeta_n=\pi/3, \pi$, and $5\pi/3$ in eq. 4. In another example, the one-pointed separatrix having one sharp corner 12 of FIG. 5c has $I_n/kB=0.359$ in a helical winding 14 at $\zeta_n=0$ and $I_n/kB_o=0.274$ in helical windings 14 at $\Phi_n=2\pi/3$ and $4\pi/3$.

In the operation of the preferred embodiment of the above-mentioned practical stellarator having three helical windings 14, FIG. 10 shows how this embodiment is incorporated into the existing Model C stellarator at Princeton University. We utilize the practical parameters given in the conceptual design. Princeton University Project Matterhorn report PM-S 29 (NYO-7899c), 1957. In FIG. 10 the existing evacuated confinement tube 17 is an endless, toroidal, magnetically permeable tube forming an annulus 26 bounded by straight tube sections 27 and 29 that are connected by end loops 23 and 25 in a plane. The major radius of the end loops 23 and 25 is 43 inches and the radius of the confinement tube 17 is 4 inches with an overall length of 500 inches. Suitable means 30 evacuates tube 17 to about $2\times10^{19}$ millimeters of mercury. Conventional injection means 31 injects gas or plasma into evacuated tube 17, to a pressure of about $2\times10^1{_K}$mm. of Hg, and conventional heating means 33, such as ion cyclotron resonance heating means 34 and/or magnetic pumping means 35 having a suitable DC and R.F. energy source 36 and 37, respectively in one or more straight sections 27 and 29, heat the injected material up to 10 kev. or more. Conventional axial solenoid coil 15 (partially shown for ease of explanation) encircles substantially the whole tube 17 at right angles to the axis of the tube 17, i.e., the minor axis of the stellarator and spaced helical windings 14 twist coaxially evenly around this axis of tube 17 with a low pitch in the direction of the axial field $B_o$ produced by axial solenoid coil 15, as described above. Also, as described above, the currents in both the axial solenoid coil 15 and the three helical windings 14 travel in the same direction. To this end suitable variable DC source 41 for solenoid coil 15 and similar DC source 43 for helical windings 14 are provided.

By simultaneously energizing the axial solenoid coil 15 and the helical windings 14 in the same direction selectively so that the fields reinforce each other, an internal separatrix 2 inside plasma 3 in column 5 is obtained with high shear and negative $V''$ outside the internal separatrix 2 and while also maintaining the desired magnetic surfaces 7 for providing an internal magnetic separatrix 2 forming a magnetic flux surface on which the average magnetic field is such that the plasma 3 in column 5 has a maximum plasma density gradient inside the internal separatrix 2, and a plasma density gradient outwardly from the internal separatrix 2 to an outer, nested, concentric, closed, toroidal, magnetic surface 7, which was described above.

Moreover, these are obtained without the internal conductors described in the above-mentioned spherators or in U.S. Pat. No. 3,219,534 by the coinventor of this invention Thus this invention provides a "seedless" multipole, i.e., this invention preserves the advantage of the heretofore-known high-temperature, plasma-confining multipoles described in the above-cited reference.

This invention has the advantages of providing a stellarator having a separatrix that occurs inside the plasma and effectively utilizes the strong stabilizing properties that arise in the vicinity of the separatrix. Additionally, the stellarator of this invention combines strong shear and rotational transform with a strong favorable average gradient of magnetic field strength.

As far as we are aware, the present approach of this invention of providing large rotational transform, high shear, and favorable average curvature simultaneously without internal current-carrying conductors is a completely new idea giving improvement factors over existing stellarators of the order of up to 10 or more. Moreover, while the existence of a lobbed configuration was previously recognized by Backus (Tech. Memo. 53, Sept. 16, 1957, printed by Princeton University) until now there was no awareness of the special stabilizing properties of the configuration of this invention as indicated by the fact that the heretofore known stellarator designs followed the usual concept.

What is claimed is:

1. In a stellarator method for confining a column 5 of plasma 3 in a system of the type having in a plane an endless, toroidal, magnetically permeable confinement tube 17, and axial solenoid and helical winding means around said tube, the steps, comprising energizing an axial solenoid 14 for establishing in said confinement tube 17 a set 9 of nested, concentric, closed, toroidal, magnetic surfaces 7 along the axis of the confinement tube 17, providing a plasma 3 in said magnetic surfaces 7, and energizing equally spaced helical windings 14 around said tube, concentric with the axis thereof and in the same direction as said axial solenoid 14 for producing an internal magnetic separatrix 2 entirely surrounded by a set 9 of nested concentric, closed magnetic surfaces 7 and forming a flux surface on which he average magnetic field is such that said plasma 3 has a maximum plasma density inside said internal magnetic separatrix 2 and a plasma density gradient outwardly therefrom to an outer of said nested, concentric, closed, toroidal, magnetic surfaces 7, thereby to provide a stable equilibrium region for confining said plasma both inside and outside said internal separatrix.

2. The invention of claim 1 in which said internal magnetic separatrix 2 forms a triangular cross section having three sharp corners 12.

3. The invention of claim 1 in which said confinement tube 17 has a large ratio of major to minor radius, and said helical windings 14 have perfect helical symmetry forming helixes of the same pitch for providing a rotational transform $\iota$, strong shear $\theta$, and deep negative average magnetic wells $V''$.

4. The invention of claim 1 having stagnation lines located to make $V'$ a maximum on said internal magnetic separatrix 2 and decreasing immediately outside thereof, a rotational transform $\iota$ on said internal magnetic separatrix 2 of $2\pi$, and both large rotational transform $\iota$ and large shear $\theta$ in a strong negative $V''$ region just outside said separatrix 2.

5. The invention of claim 1 in which said helical windings 14 comprise $n$ turns at radius $a$ each twisting around the axis of said confinement tube 17 in the direction of the field $B_o$ produced by said axial solenoid coil so that each turn is located at $\theta = (kz + \theta_n)$ and carries $I_n$ current.

6. The invention of claim 1 in which said helical windings 14, comprise three helical wires, 120° apart at radius $a$, and have equal currents $I_n$ directed therein along the field $B_o$ produced by said axial solenoid 15 and wherein the current $I_n = r/a = 2^{11/3}$ in the helical windings 14.

7. The invention of claim 1 in which said internal magnetic separatrix 2 represents a magnetic flux surface in a set 9 of said nested magnetic surfaces 7, outside of which said nested magnetic surfaces 7, have a different shape from those on the inside of said separatrix 2.

8. The invention of claim 1 in which said internal magnetic separatrix 2 has lobes 13 forming inherent natural divertors 21.

9. The invention of claim 1 in which said helical windings 14, comprise conductors that carry different amounts of current in the same direction in neighboring conductors so as selectively to reinforce the magnetic surfaces 7 produced by said axial solenoid 15.